(12) United States Patent
Petridis et al.

(10) Patent No.: US 9,739,347 B2
(45) Date of Patent: Aug. 22, 2017

(54) BELT SLIP MONITOR

(71) Applicant: Ford Global Technologies, LLC, Dearborn, MI (US)

(72) Inventors: Anthemios Philemon Petridis, Bishop's Stortford (GB); Donatus Andreas Josephine Kees, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 14/631,533

(22) Filed: Feb. 25, 2015

(65) Prior Publication Data

US 2015/0260264 A1    Sep. 17, 2015

(30) Foreign Application Priority Data

Mar. 11, 2014    (GB) .................................. 1404270.9

(51) Int. Cl.
*F16H 7/08*    (2006.01)
*G01L 5/04*    (2006.01)
*F02B 67/06*    (2006.01)

(52) U.S. Cl.
CPC .................. *F16H 7/08* (2013.01); *G01L 5/04* (2013.01); *F02B 67/06* (2013.01); *F16H 2007/0861* (2013.01); *F16H 2007/0885* (2013.01); *F16H 2007/0897* (2013.01)

(58) Field of Classification Search
CPC .. F02B 67/06; F16H 61/66272; B60W 20/00; F02N 15/08; Y10T 477/6237

USPC ......................................................... 474/102
See application file for complete search history.

(56) References Cited

U.S. PATENT DOCUMENTS

| | | | |
|---|---|---|---|
| 4,575,367 A | 3/1986 | Karmel | |
| 6,436,004 B1* | 8/2002 | Loffler | F16H 61/66272 477/45 |
| 6,602,160 B2* | 8/2003 | Tsutsui | F16H 61/66272 474/28 |
| 6,834,228 B2 | 12/2004 | Serkh et al. | |
| 7,192,383 B2* | 3/2007 | Shimada | B60W 10/06 477/110 |
| 7,573,219 B2* | 8/2009 | Kees | F02N 11/04 318/432 |
| 7,771,302 B2 | 8/2010 | Pendergrass | |
| 7,974,749 B2* | 7/2011 | Zettel | B60K 25/02 123/339.15 |
| 8,384,354 B2 | 2/2013 | Chandler et al. | |
| 2001/0049315 A1* | 12/2001 | Tsutsui | F16H 61/66272 477/44 |

(Continued)

FOREIGN PATENT DOCUMENTS

| | | |
|---|---|---|
| CN | 103224118 A | 7/2013 |
| DE | 102009035310 A1 | 4/2010 |

(Continued)

*Primary Examiner* — Henry Liu
(74) *Attorney, Agent, or Firm* — Greg Brown; McCoy Russell LLP

(57) ABSTRACT

A belt slip monitor system and method configured to determine whether a belt coupled to a motor-generator is slipping based on operational states of first and second movable portions of the belt slip monitor, wherein the operational states of the first and second movable portions are dependent upon the tension in the belt.

20 Claims, 11 Drawing Sheets

(56) References Cited

U.S. PATENT DOCUMENTS

| | | | |
|---|---|---|---|
| 2004/0063537 A1* | 4/2004 | Shimada | B60W 10/06 477/44 |
| 2004/0084008 A1* | 5/2004 | Serkh | F01L 1/024 123/198 R |
| 2005/0077731 A1* | 4/2005 | Shimizu | B60K 6/44 290/40 C |
| 2006/0054128 A1* | 3/2006 | Allyn | F02B 67/06 123/198 D |
| 2006/0249118 A1* | 11/2006 | Serkh | F01L 1/024 123/198 R |
| 2007/0200522 A1* | 8/2007 | Kees | F02N 11/04 318/432 |
| 2007/0255476 A1* | 11/2007 | Takamatsu | B60T 8/00 701/78 |
| 2008/0013887 A1* | 1/2008 | Sappey | G01J 3/02 385/52 |
| 2008/0021603 A1* | 1/2008 | Zettel | B60K 25/02 701/33.5 |
| 2009/0131208 A1 | 5/2009 | Hawryluck et al. | |
| 2009/0287384 A1* | 11/2009 | Lee | F16H 61/66272 701/65 |
| 2010/0060677 A1* | 3/2010 | Jones | G01M 13/023 347/5 |
| 2011/0000421 A1* | 1/2011 | Zhang | G01M 13/023 116/28 R |
| 2011/0070986 A1* | 3/2011 | Maguire | F02B 67/06 474/135 |
| 2011/0234146 A1* | 9/2011 | Iwashita | B23Q 17/10 318/799 |
| 2012/0158226 A1* | 6/2012 | Prucka | B60K 6/485 701/22 |
| 2013/0035204 A1* | 2/2013 | Noboru | F02N 15/08 477/39 |
| 2013/0274980 A1* | 10/2013 | Takamura | B60K 6/48 701/22 |
| 2014/0309882 A1* | 10/2014 | Antchak | F02B 67/06 701/36 |
| 2015/0057117 A1* | 2/2015 | Antchak | F16H 7/1263 474/109 |
| 2015/0226171 A1* | 8/2015 | Kees | B60K 6/485 290/31 |

FOREIGN PATENT DOCUMENTS

| | | |
|---|---|---|
| EP | 1158287 A2 | 11/2001 |
| FR | 2899685 A1 | 10/2007 |
| JP | 0396626 H | 4/1991 |
| JP | 2004301761 A | 10/2004 |
| JP | 2013180681 A | 9/2013 |
| WO | 2013033822 A1 | 3/2013 |

* cited by examiner

BELT SLIP MONITOR

CROSS REFERENCE TO RELATED APPLICATIONS

The present application claims priority to Great Britain Patent Application No 1404270.9, "Belt Slip Monitor," filed Mar. 11, 2014, the entire contents of which are hereby incorporated by reference for all purposes.

FIELD

This current application relates to a belt slip monitor for a belt, and in particular, but not exclusively, relates to a belt slip monitor configured to determine whether a belt coupled to a motor-generator is slipping based on operational states of first and second movable portions of the belt slip monitor.

BACKGROUND\SUMMARY

Motor-generators, such as a belt-driven integrated starter generator (ISG), may be used in assisting the operation of an engine by providing additional torque, or by supplying electrical power to an electrical system of a vehicle. Belt tension of an accessory drive pulley of an ISG is typically monitored in order to reduce friction losses.

Belt tension may be monitored by way of a passive tension system, for example. Alternatively, belt tension may be monitored by actively controlled tensioner devices to increase belt tension only when high torque demands are made.

However, the inventors herein have recognized potential issues with such systems. Passive tensioning systems are set at a tension sufficient to avoid slip at a maximum operating torque, which may result in a reduction of fuel efficiency. Actively controlled tensioner devices may be less reliable and require electronic actuators which may be more costly. Furthermore, spring-biased tensioning devices require additional knowledge of a spring rate and may be prone to the effect of tolerances.

One potential approach to at least partially address some of the above issues includes a system and a method for a belt slip monitor wherein belt tension and belt slippage may be monitored, and belt tension and/or operational torque may be adjusted based on monitoring belt slippage.

In one example, a belt slip monitor for a belt coupled to a motor-generator, may comprise a first movable portion movable with respect to the motor-generator, a second movable portion movably coupled to the first movable portion, the second movable portion being coupled to the belt such that operational states of the first and second movable portions of the belt slip monitor are dependent upon the tension in the belt, a first sensor configured to determine the operational state of the first movable portion, and a second sensor configured to determine the operational state of the second movable portion, wherein the belt slip monitor is configured to determine whether the belt is slipping based on the operational state of the first and second movable portions.

In this way, the belt slip monitor, a passive tensioning device, may detect slip both when the ISG transmits torque to the system, and removes torque from the system. Further, the belt slip monitor system may adjust operational torque, and thereby belt tension, so that fuel efficiency may increase, unlike known passive tensioner devices that must operate at a high tension.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
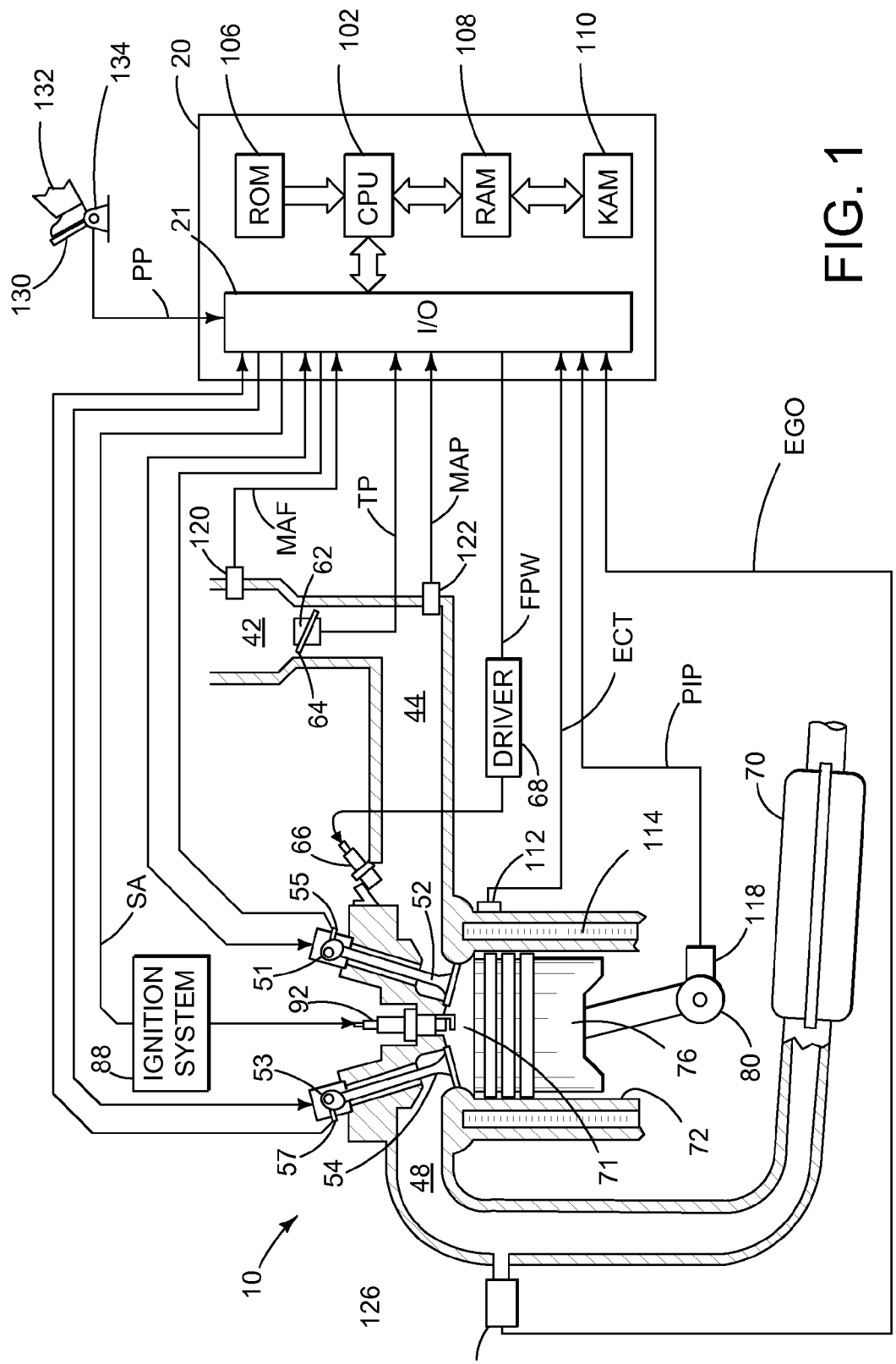
FIG. 1 is an example schematic diagram of one cylinder of multi-cylinder engine of a motor vehicle comprising a control system.

Motor-generators may be used to selectively assist in the operation of an engine or to supply electrical power to an electrical system of the engine and/or a vehicle. Motor-generators may be used therefore as part of parallel hybrid technology. As vehicle manufacturers move to incorporate increasing levels of hybrid technology into their products, the alternator of the engine may be replaced by the motor-generator, for example an Integrated Starter Generator (ISG), on an accessory belt drive system.

By replacing the alternator with the ISG, regenerative braking energy may be captured and the ISG may provide torque assist during periods of high-load operation. The ISG may also enable faster engine restarts during start-stop events. Whilst a standard alternator system only requires torque transmission in a single direction, an ISG requires torque transmission in both directions, with increased levels of torque transmission compared to the standard alternator system. Higher levels of torque transmission mean that the belt tension must be set for the toughest use case, for example a water-wading scenario during which the belt friction is reduced. However, accounting for such a scenario can result in a high tension in the belt, which will result in a reduced fuel economy.

In order to minimize the friction losses of the accessory drive belt system, it is desirable to maintain as low a belt tension whenever possible. It is known to provide adjustable tensioner devices to increase the belt tension only when high torque demands are made. However, such actively controlled tensioner devices may be less reliable.

The present current application seeks to address these issues. According to an aspect of the present application there is provided a belt slip monitor for a belt coupled to a motor-generator, the belt slip monitor comprising: a first movable portion movable with respect to the motor-generator; a second movable portion movably coupled to the first movable portion, the second movable portion being coupled to the belt such that operational states of the first and second movable portions of the belt slip monitor may be dependent upon the tension in the belt; and a first sensor configured to determine the operational state, for example position, of the first movable portion. The belt slip monitor may comprise a second sensor configured to determine the operational state, for example position, of the second movable portion. The belt slip monitor may be configured to determine whether the belt is slipping based on the operational state of the first and/or second movable portions.

The belt slip monitor may be configured to determine if the belt coupled to the motor-generator is slipping, for example due to the operational torque of the motor-generator and/or any other device associated with the belt, such as a crankshaft pulley or an accessory device pulley. The belt slip monitor may comprise one or more control devices configured to adjust the operational torque of the motor-generator in response to the operational state of the first and/or second movable portions of the belt slip monitor such that the belt no longer slips.

The second movable portion may be coupled to the belt at a first end of the second movable portion. The second movable portion may be coupled to the belt at a second end of the second movable portion. The first and second ends of the second movable portion may be coupled to the belt either side of the motor-generator.

The tension in the belt may be dependent upon the operational torque of the motor-generator. The belt slip monitor may be configured to apply a pretension to the belt.

The first movable portion may be coupled to an anchor point that is substantially fixed relative to the movement of the motor-generator. The first and second movable portions may be configured to move with respect to the belt. The first and second movable portions may be rotationally and/or slidably movable. The first and second movable portions may be rotationally and/or slidably coupled to each other. The second movable portion may comprise one or more pulleys for engaging the belt. The first and/or second movable portions may be coupled to an engine of a vehicle.

The first and second sensors may comprise angle sensors configured to determine the angular position of the first and/or second movable portions. The first and second sensors may comprise strain gauges configured to determine the strain in the first and/or second movable portions. At least a portion of the first sensor may be attachable to the first movable portion. At least a portion of the first sensor may be attachable to the engine, vehicle or any other supporting structure. At least a portion of the second sensor may be attachable to the second movable portion. At least a portion of the second sensor may be attachable to the first movable portion.

The motor-generator may comprise an integrated starter-generator. The belt may be an accessory drive belt, for example a serpentine belt.

An engine may be provided comprising one or more of the belt slip monitors according to the present application.

A vehicle, such as a motor vehicle, may be provided comprising one or more of the belt slip monitors and/or the engine according to the present application.

The engine and/or the vehicle may comprise one or more control devices configured to adjust the operational torque of the motor-generator.

According to another aspect of the present application there is provided a method of monitoring the slip of a belt coupled to a motor-generator using a belt slip monitor, the method comprising: determining the operational state of a first movable portion of the belt slip monitor using a first sensor, wherein the first movable portion is movable with respect to the motor-generator; determining the operational state of a second movable portion of the belt slip monitor using a second sensor, wherein the second movable portion is movably coupled to the first movable portion, the second movable portion being coupled to the belt such that the operational states of the first and second movable portions of the belt slip monitor may be dependent upon the tension in the belt; and determining whether the belt is slipping based on the operational state of the first and second movable portions.

The tension in the belt may be dependent upon the operational torque of the motor-generator. The method may comprise determining if the belt coupled to the motor-generator is slipping, for example due to the operational torque of the motor-generator.

The method may comprise adjusting the operational torque of the motor-generator in response to the operational state of the first and/or second movable portions of the belt slip monitor such that the belt does not slip.

The method may comprise corroborating that the belt is slipping by comparing the outputs from the first and second sensors.

The method may comprise monitoring belt slip and implementing a countermeasure to reduce torque demand through the belt if slip is detected. For example, the torque demand though the belt may be reduced by adjusting the operational torque of the motor-generator, the engine and/or one or more accessory devices. Reducing the torque demand through the belt may result in a reduced belt tension. Belt slip may be monitored by way of a passive tensioning device. Example countermeasures may include: inhibiting start-stop events; using the motor-generator and/or a starter motor of the engine to assist cranking the engine; inhibiting ISG functions that transmit high torque through the belt; and/or providing a suitable indication to the driver when there is a problem with the belt. In this manner, the belt tension may be minimized across a range of operational conditions of the ISG.

The present application also provides software, such as a computer program or a computer program product for carrying out any of the methods described herein, and a computer readable medium having stored thereon a program for carrying out any of the methods described herein. A computer program embodying the present application may be stored on a computer-readable medium, or it could, for example, be in the form of a signal such as a downloadable data signal provided from an Internet website, or it could be in any other form.

Referring to FIG. 1, a schematic diagram showing one cylinder of multi-cylinder engine 10, which may be included in a propulsion system of an automobile, is illustrated. Engine 10 may be controlled at least partially by a control system including controller 20 and by input from a vehicle operator 132 via an input device 130. In this example, input device 130 includes an accelerator pedal and a pedal position sensor 134 for generating a proportional pedal position signal PP. Combustion chamber (i.e., cylinder) 71 of engine 10 may include combustion chamber walls 72 with piston 76 positioned therein. Piston 76 may be coupled to crankshaft 80 so that reciprocating motion of the piston is translated into rotational motion of the crankshaft. Crankshaft 80 may be coupled to at least one drive wheel of a vehicle via an intermediate transmission system. Further, a starter motor may be coupled to crankshaft 80 via a flywheel to enable a starting operation of engine 10. For example, an ISG may be coupled to the crankshaft via a FEAD belt, which may have a passive tensioner as depicted in FIGS. 2A-3B.

Combustion chamber 71 may receive intake air from intake manifold 44 via intake passage 42 and may exhaust combustion gases via exhaust passage 48. Intake manifold 44 and exhaust passage 48 can selectively communicate with combustion chamber 71 via respective intake valve 52 and exhaust valve 54. In some embodiments, combustion chamber 71 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 20 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 71 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 71. Fuel injector 66 may inject fuel in proportion to the pulse width of signal FPW received from controller 20 via electronic driver 68. Fuel may be delivered to fuel injector 66 by a fuel system (not shown) including a fuel tank, a fuel pump, and a fuel rail. In some embodiments, combustion chamber 71 may alternatively or additionally include a fuel injector coupled directly to combustion chamber 71 for injecting fuel directly therein, in a manner known as direct injection.

Intake passage 42 may include a throttle 62 having a throttle plate 64. In this particular example, the position of throttle plate 64 may be varied by controller 20 via a signal provided to an electric motor or actuator included with throttle 62, a configuration that is commonly referred to as electronic throttle control (ETC). In this manner, throttle 62 may be operated to vary the intake air provided to combustion chamber 71 among other engine cylinders. The position of throttle plate 64 may be provided to controller 20 by throttle position signal TP. Intake passage 42 may include a mass air flow sensor 120 and a manifold air pressure sensor 122 for providing respective signals MAF and MAP to controller 20.

Ignition system 88 can provide an ignition spark to combustion chamber 71 via spark plug 92 in response to spark advance signal SA from controller 20, under select operating modes. Though spark ignition components are shown, in some embodiments, combustion chamber 71 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Figure 3A:
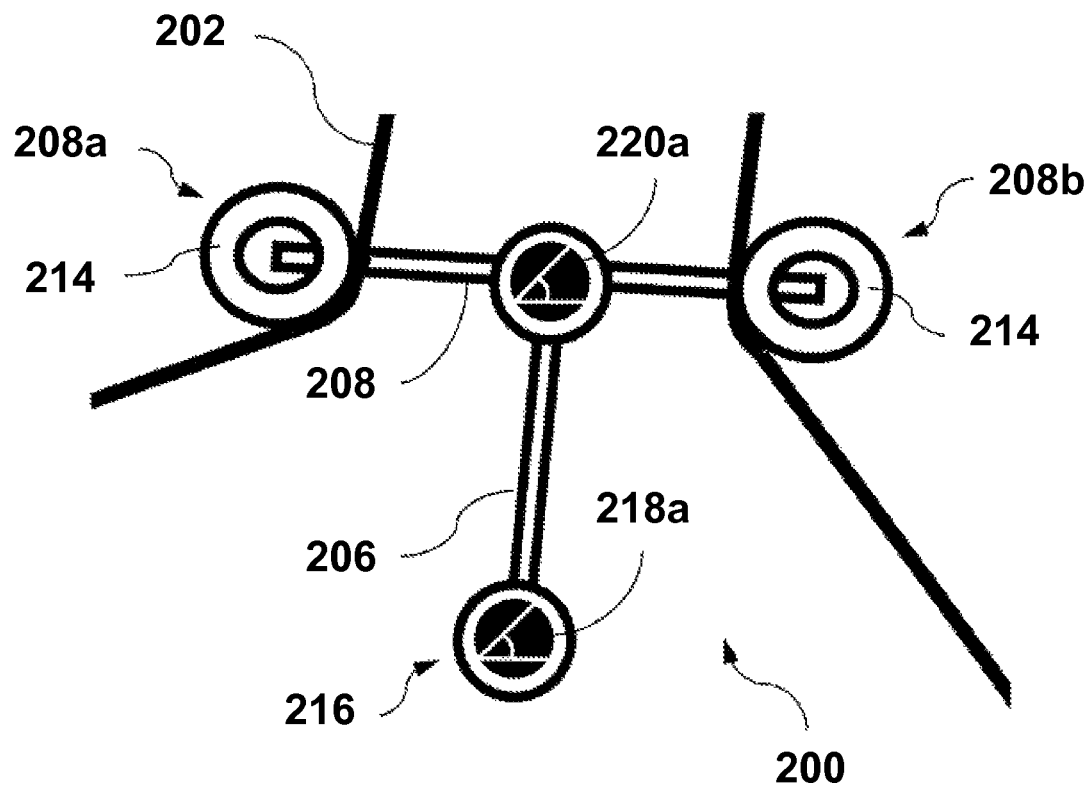
FIG. 3A shows the belt slip monitor comprising a first and second angle sensor.
Figure 3B:
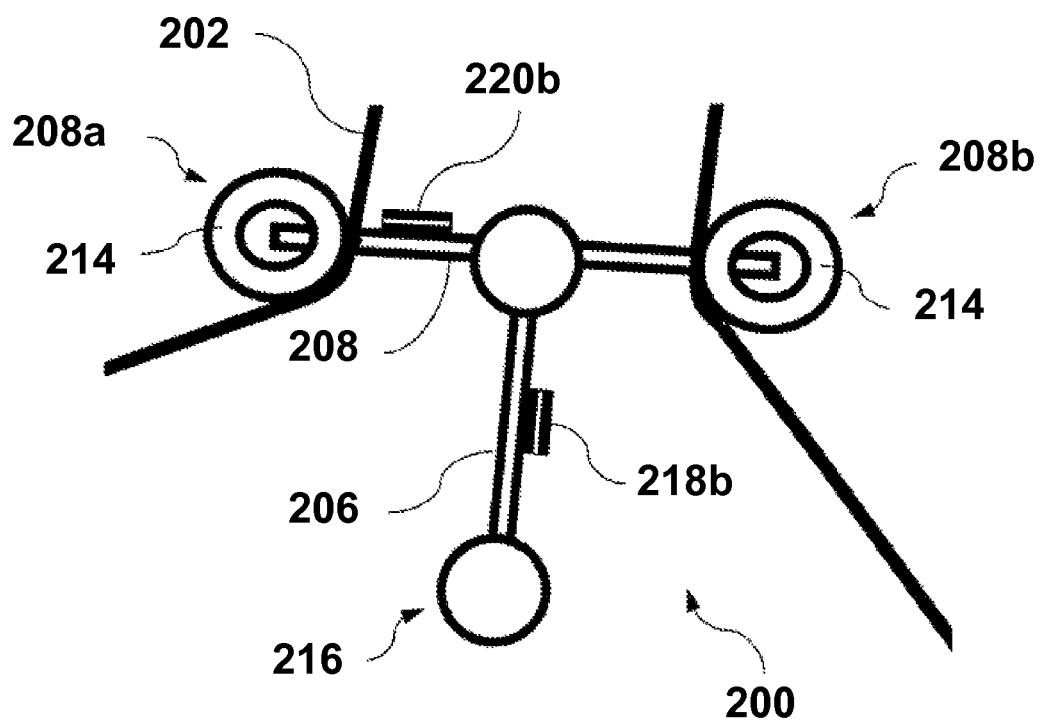
FIG. 3B shows the belt slip monitor comprising a first and second strain gauge.

Controller 20 is shown in FIG. 1 as a microcomputer, including microprocessor unit 102, input/output ports 21, an electronic storage medium for executable programs and calibration values shown as read only memory chip 106 in this particular example, random access memory 108, keep alive memory 110, and a data bus. Controller 20 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 80; throttle position (TP) from a throttle position sensor; and absolute manifold pressure signal, MAP, from sensor 122 and from sensors on the passive tensioner device on the FEAD belt, as shown in FIGS. 3A and 3B. Engine speed signal, RPM, may be generated by controller 20 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 20 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2A:
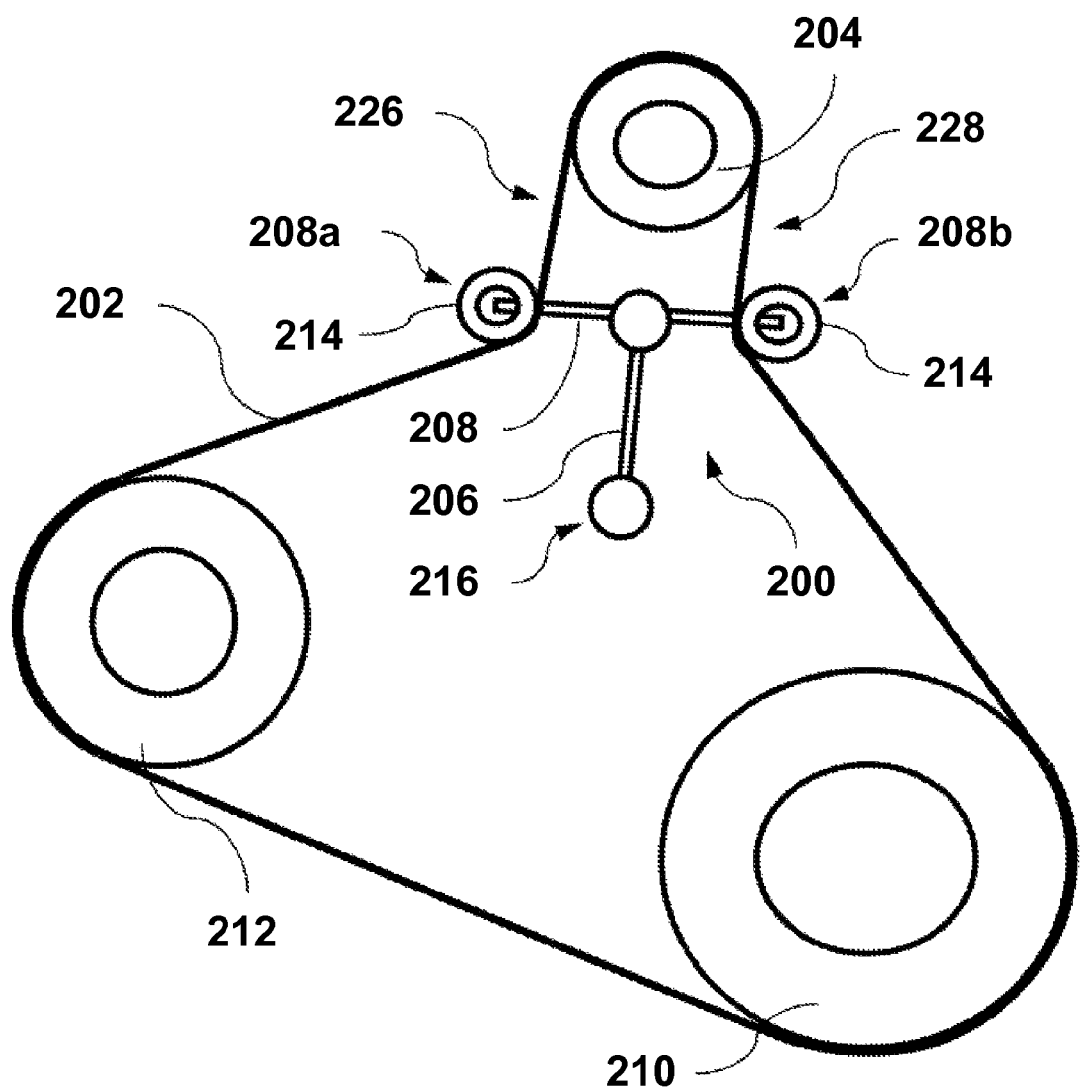
FIG. 2A shows a belt slip monitor for a belt coupled to a motor generator pulley, a crankshaft pullet and an accessory pulley.

FIG. 2A shows a belt slip monitor 200 for a belt 202 coupled to a motor-generator pulley 204, for example a pulley of an integrated starter-generator of an engine. The belt slip monitor 200 comprises a first movable portion 206 that is movable with respect to the motor-generator 204 and second movable portion 208 movably coupled to the first movable portion 206. The second movable portion 208 is coupled to the belt 202 such that operational states of the first and second movable portions 206, 208 of the belt slip monitor 200 are dependent upon the tension in the belt 202.

In the example shown in FIG. 2A, the belt 202 is an accessory drive belt, for example a serpentine belt or a FEAD belt, that is coupled to the motor-generator pulley 204, a crankshaft pulley 210 and an accessory device pulley 212, for example a pump pulley or a compressor pulley. Although not shown, further accessory devices and pulleys may be coupled to the belt 202. The second movable portion 208 of the belt slip monitor 200 is coupled to the belt 202 at a first end 208a on a first side 226 of the motor-generator pulley 204 and at a second end 208b on a second side 228 of the motor-generator pulley 204. The second movable portion 208 is coupled to the belt 202 by way of pulleys 214 configured to engage the belt 202 at the first and second ends 208a, 208b of the second movable portion 208. In an alternative example, the first and second ends 208a, 208b of the second movable portion 208 may be coupled to the belt on either side of the crankshaft pulley 210, the accessory device pulley 212 or any other appropriate pulley for which it is desirable to monitor belt slip.

In the example shown in FIG. 2A, the first movable portion 206 is coupled to an anchor point 216 that is fixed relative to the motor-generator pulley 204. The anchor point 216 may comprise a portion of the engine and/or a portion of a vehicle. The first movable portion 206 is rotationally coupled to the anchor point 216. The second movable portion 208 is rotationally coupled to the first movable portion 206. The first and second movable portions 206, 208 may be thus configured to move with respect to the belt 202. However, in an alternative example, the first and second movable portions 206, 208 may be rotationally and/or slidably movable with respect to the belt 202 and rotationally and/or slidably coupled to each other.

The first and/or second movable portions 206, 208 may be substantially elongate. The first movable portion 206 may be provided with a first coupling at a first end for rotatably coupling the first movable portion 206 to the anchor point 216. The first movable portion 206 may be provided with a second coupling at a second end for rotatably coupling the first movable portion 206 to the second movable portion 208. The second movable portion 208 may be provided with a third coupling between first and second ends of the second movable portion 208. The third coupling may be provided approximately midway between the first and second ends of the second movable portion 208. The third coupling may engage the second coupling of the first movable portion 206 to permit relative rotation between the first and second movable portions 206, 208.

The rotatable couplings between the anchor point 216 and the first movable portion 206 and/or between the first movable portion 206 and the second movable portion 208 may or may not be resisted. For example, in the case of the rotatable couplings being resisted, the rotatable couplings may be provided with a resilient element, such as a coil spring and/or any other resilient element. Such resistance to the rotation of the first and/or second movable portions 206, 208 may apply in either rotational direction and may act to return the first and/or second movable portions 206, 208 to a default position, for example as shown in FIG. 2A.

The belt slip monitor 200 may be configured to apply a pretension to the belt 202, for example by virtue of the length of the first and second movable portions 206, 208, such that when the engine is switched off, the tension in the belt 202 consists solely of the static pretension. In such a situation, the tension in the belt 202 on the first side 226 of the motor-generator pulley 204 is substantially equal to the tension in the belt 202 on the second side 228 of the motor-generator pulley 204 and the first and second movable portions 206, 208 are in first operational states, as shown in FIG. 2A. In another example, the belt slip monitor 200 may be biased by one or more biasing elements, for example a spring, such that the pretension applied to the belt 202 by the belt slip monitor 200 is dependent upon the configuration of the biasing elements.

In the examples given below, the operational states of the first and second movable portions 206, 208 relate to the angular position of and/or the strain in the first and second movable portions 206, 208. However, it may be appreciated that the operational states of the first and second movable portions 206, 208 may relate to any change in position of the first and second movable portions 206, 208, for example rotational and or translational changes in position, or indeed any parameter of the first and second movable portions 206, 208 that may be affected by the tension in the belt 202.

The belt slip monitor 200 comprises a first sensor configured to determine the operational state of the first movable portion 206 and a second sensor configured to determine the operational state of the second movable portion 208. In this manner, the belt slip monitor 200 is configured to determine whether the belt 202 is slipping based on operational states of the first and second movable portions 206, 208.

Figure 2B:
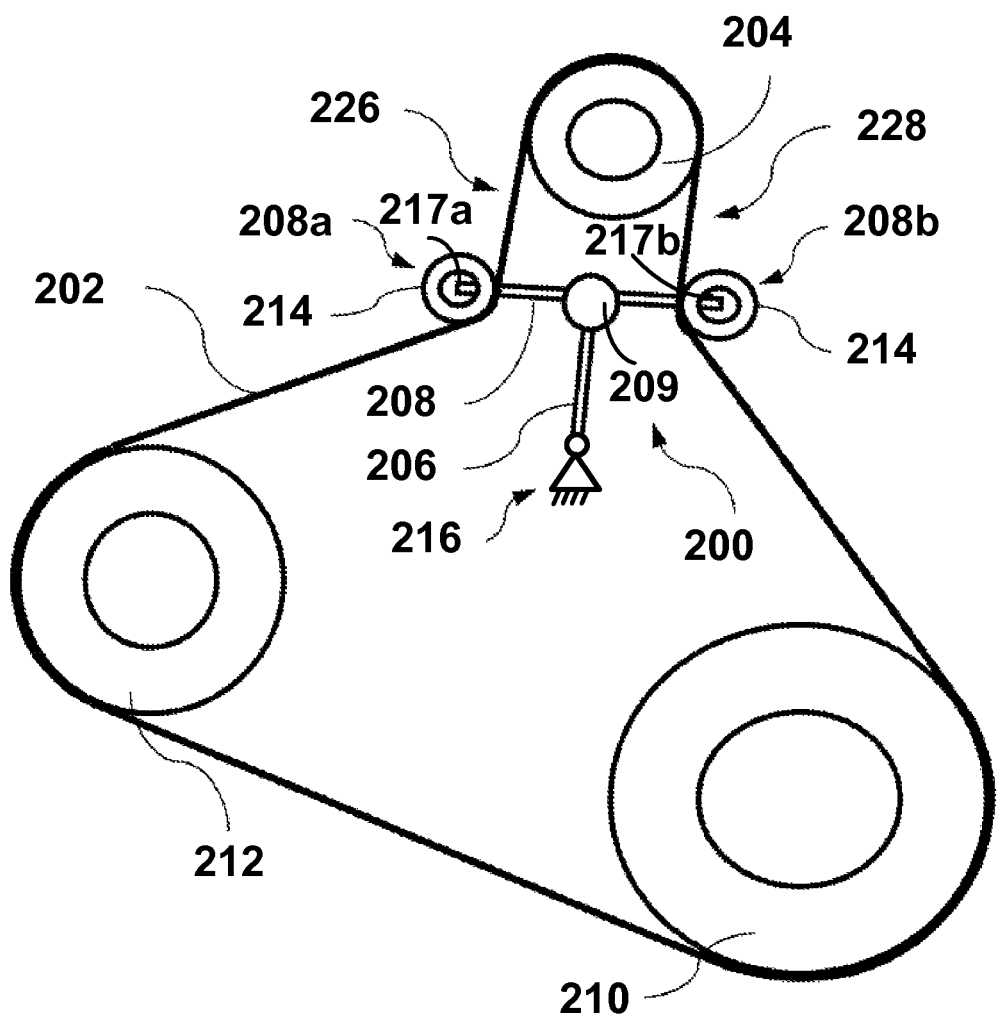
FIG. 2B shows a belt slip monitor for a belt.

Turning to FIG. 2B, an additional example of anchor point 216 of FIG. 2A is shown. Anchor point 216 is rotatably fixed to a cylinder block, for example. First movable portion 206 therefore pivots with respect to the anchor point 216 which is rotatably fixed to the cylinder block. Second movable portion 208 may be rotatably fixed to first movable portion 206 about pivot 209, but not to the cylinder block. Therefore, second movable portion 208 may pivot with respect to first movable portion 206. Further, second movable portion 208 is coupled to belt 202 by way of pulleys 214, and is not fixed to the cylinder block. In one example, pulley 214 on first side 226 is rotatably fixed to second movable portion 208 by pivot 217a so that it moves relative to the block but is not fixed to it. Pivots 217a and 217b, as well as the pivot between the arm 208 and arm 206 may each float relative to the block, in that they are not rotatably fixed to the block. Pulley 214 on second side 228 is rotatably fixed to second movable portion 208 about a pivot 217b.

Figure 2C:
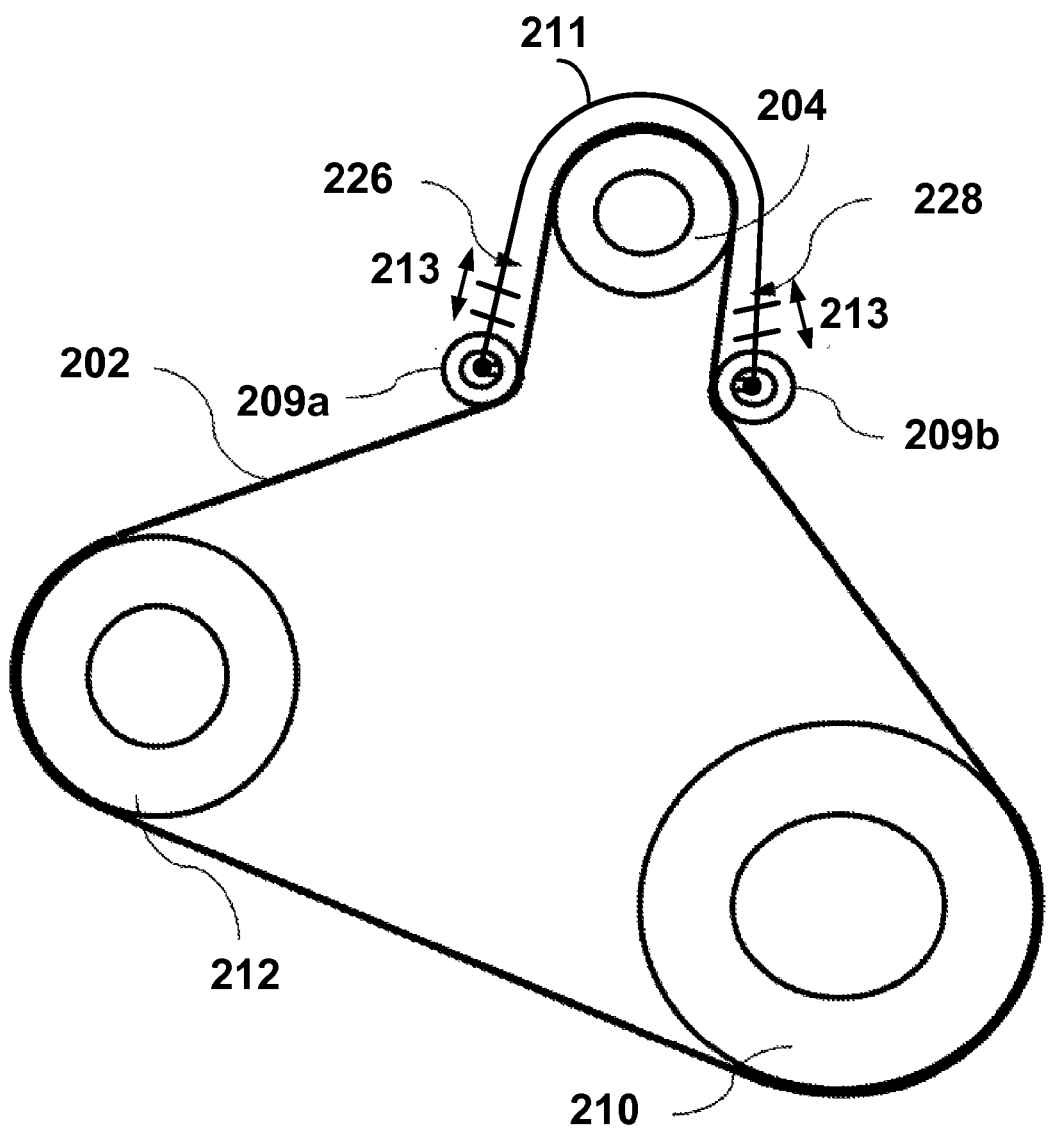
FIG. 2C shows an alternative embodiment of a belt slip monitor.

FIG. 2C depicts an alternative embodiment of belt slip monitor 200. In this example, the belt slip monitor comprises two rollers. One rotatable roller is located on first side 226 and the second rotatable roller is located on the second side 228. Further, the rollers are attached via a tensioner arm 211 such that the arm may be pretensioned to provide compression forces on the band. The tensioner arm may be elongate, shaped with a rectangular cross-section and formed of metal, in one example. The rotatable rollers may be in direct contact with the belt such that the rollers move in the direction of arrows 213 based on a tension of the belt. It may be appreciated that the rollers are not fixed to the block but rather float relative to the block. Further, the belt slip monitor may comprise a first sensor configured to determine the position and/or operational state of the first roller, and a second sensor configured to determine the position and/or operational state of the second roller. In this manner, the belt slip monitor 200 is configured to determine whether the belt 202 is slipping based on operational states and/or positions of the first and second movable rollers 209a and 209b.

In the example shown in FIG. 3A, the first and second sensors comprise first and second angle sensors 218a, 220a configured to determine the angular position of the first and second movable portions 206, 208 respectively. The first angle sensor 218*a* is configured to determine the angular position of the first movable portion 206 with respect to the anchor point 216 and the second angle sensor 220*a* is configured to determine the angular position of the second movable portion 208 with respect to the first movable portion 206.

In the example shown in FIG. 3B, the first and second sensors comprise first and second strain gauges 218*b*, 220*b* configured to determine the strain in the first and second movable portions 206, 208 respectively. It may be appreciated, however, that in an alternative example the belt slip monitor 200 may comprise any number of angle sensors and/or strain gauges configured to determine the operational states of the first and second movable portions 206, 208. In this manner, the belt slip monitor 200 may be configured to determine whether the belt 202 is slipping based on the angular positions of and/or the strain in the first and second movable portions 206, 208.

In the examples shown in FIGS. 3A and 3B, the first and second sensors are attached to the first and second movable portions 206, 208 respectively. However, it may be appreciated that first and second sensors may be attached to any portion of the belt slip monitor 200, a portion of the engine and/or a portion of the vehicle such that the first and second sensors are configured to determine the operational states of the first and second movable portions 206, 208. For example, the angle sensors 218*a*, 220*a* may comprise a portion on the respective movable portion and a further portion in a fixed position relative to the anchor point 216 or the first movable portion 206. The respective angle sensor movable portions may together determine the angle of the first and second movable portions 206, 208.

The belt slip monitor 200 may be configured to determine if the belt 202 coupled to the motor-generator pulley 204 is slipping, for example due to the operational torque of the motor-generator. For example, when the motor-generator functions as a motor, e.g. as a starter motor of the engine, the motor-generator is configured to drive the belt 202. When motor-generator functions as the motor, the motor-generator applies a driving torque to the belt 202 in the same direction as a torque input to the belt 202 by the crankshaft pulley 210 when the motor is supplementing drive produced by the engine. In another example, the motor-generator applies a driving torque to the belt 202 in the opposite direction to a resistive torque applied by the crankshaft pulley 210 when the motor is starting the engine. In such a circumstance, the belt 202 will slip if the operational torque of the motor-generator, e.g. the driving torque applied by the motor-generator, is sufficiently large. Conversely, when the motor-generator functions as a generator, e.g. as an alternator of the engine, the motor-generator is configured to be driven by the belt 202. When the motor-generator functions as the generator, the motor-generator applies a resistive torque to the belt 202 in the opposite direction to the torque input to the belt 202 by the crankshaft pulley 210. In such a circumstance, the belt 202 will slip if the operational torque of the motor-generator, e.g., the resistive torque applied to the belt 202 by the motor-generator, is sufficiently large. The belt 202 may also slip if a torque (resistive or otherwise) applied by the crankshaft pulley 210 is sufficiently large.

When the belt 202 slips, the tension on the belt 202 is significantly reduced. Accordingly, the belt may return to substantially the position shown in FIG. 2A. The return of the belt 202 to this position, which is indicative of belt slip occurring, may be detected substantially by the first and second movable portions 206, 208.

The belt slip monitor may comprise one or more control devices configured to adjust the operational torque of the motor-generator in response to the operational state of the first and/or second movable portions 206, 208 such that the belt 202 does not slip. For example, when motor-generator functions as the motor, the control device may be configured to reduce the driving torque of the motor-generator if the driving torque applied by the motor-generator in order to drive the belt 202 is sufficiently large to cause the belt 202 to slip. In another example, when the motor-generator functions as the generator the control device may be configured to reduce the resistive torque of the motor-generator if the resistive torque applied to the belt 202 by the motor-generator is sufficiently large to cause the belt 202 to slip.

In another example of the present application there is provided a method of monitoring the slip of the belt 202 coupled to the motor-generator using the belt slip monitor 200. The method comprises determining the operational state of the first movable portion 206 of the belt slip monitor 200 using the first sensor, wherein the first movable portion 206 is movable with respect to the motor-generator. The method further comprises determining the operational state of the second movable portion 208 of the belt slip monitor 200 using the second sensor, wherein the second movable portion 208 is movably coupled to the first movable portion 206. The second movable portion 208 is coupled to the belt 202 such that the operational states of the first and second movable portions 206, 208 of the belt slip monitor 200 are dependent upon the tension in the belt 202. The method further comprises determining whether the belt 202 is slipping based on the operational state of the first and second movable portions 206, 208.

The tension in the belt 202 may be dependent upon the operational torque of the motor-generator. In this manner, the method may further comprise determining if the belt 202 coupled to the motor-generator is slipping due to the operational torque of the motor-generator.

The method may further comprise adjusting the operational torque of the motor-generator in response to the operational state of the first and/or second movable portions 206, 208 of the belt slip monitor 200 such that the belt 202 does not slip. For example, the method may comprise supplying one or more control signals to the control device for the purpose of adjusting the operational torque of the motor-generator.

In a further example, the method may comprise corroborating that the belt 202 is slipping by comparing the outputs from the first and second sensors. For example, the tension in the belt may fluctuate, e.g., due to variations in the operational torque of the engine and/or due to vibration of the engine during normal operation. Such fluctuations may result in a false determination of belt slip. However, by monitoring outputs from both the first and second sensors, the likelihood of such a false determination may be reduced. The first and second movable portions 206, 208 move in different directions and may therefore respond to fluctuations of different frequencies and/or amplitudes. Accordingly, by corroborating the signals from the first and second movable portions 206, 208, the likelihood of false slip determination is reduced. Furthermore, in a scenario where a sensor is malfunctioning, a comparison between two sensor outputs may be used to check that the belt 202 is slipping. The method may comprise comparing the outputs from the first and second sensors against a predetermined set of values to ensure that the outputs from the first or second sensors are in fact indicative of the belt 202 slipping.

Furthermore, the provision of more than one sensor provides a redundancy in the event that there is a failure of one of the sensors.

In addition, outputs from the first and/or second sensors may be corroborated against the operational state of the motor-generator, for example if the motor-generator is disengaged and is neither generating nor receiving torque, since such a state may also result in a false determination of slip.

First Example Mode of Operation for the Belt Slip Monitor

Figure 4A:
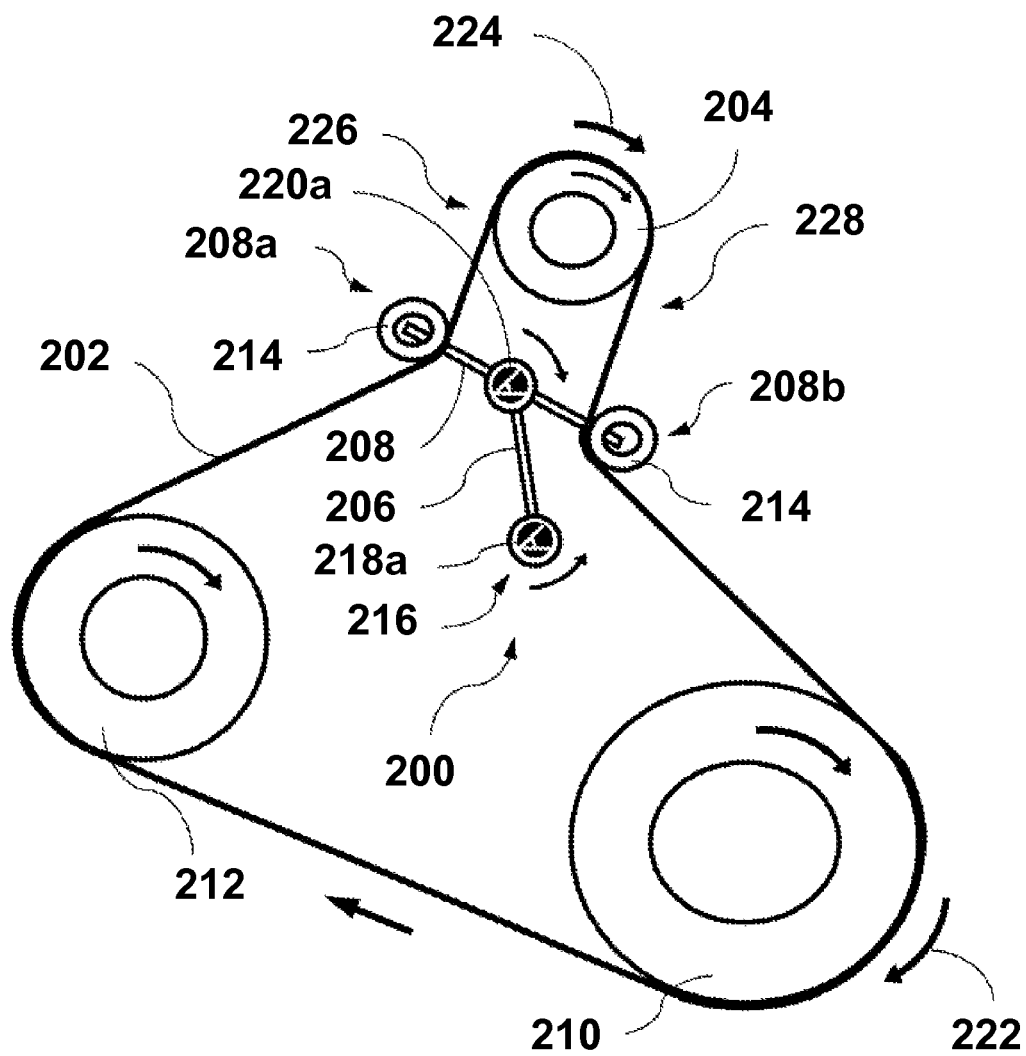
FIG. 4A shows an example mode of operation of the belt slip monitor, in which the motor-generator is operating as a motor and the belt is not slipping.
Figure 4B:
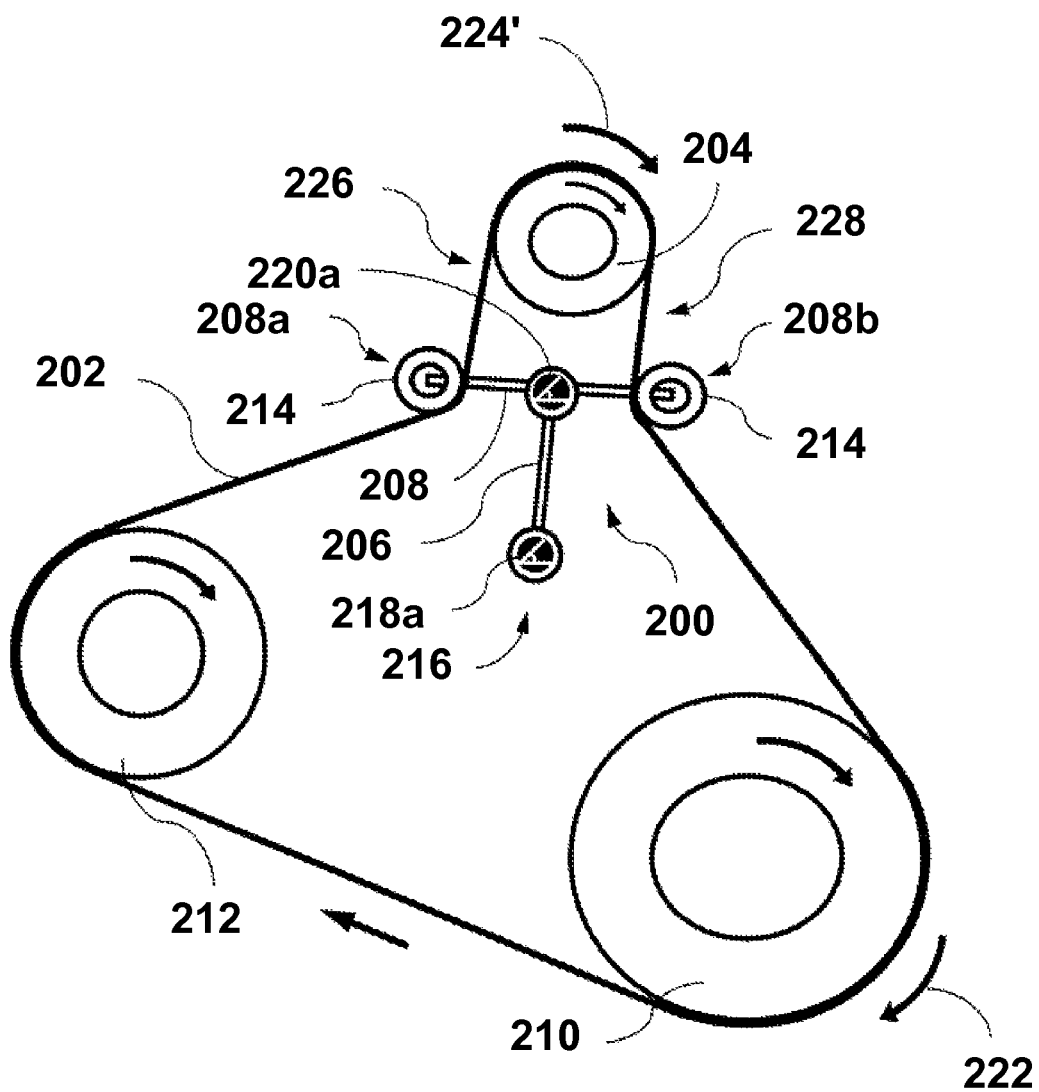
FIG. 4B shows the example mode of operation of the belt slip monitor, in which the motor-generator is operating as a motor and the belt is slipping.

FIGS. 4A and 4B depict an example mode of operation of the belt slip monitor 100, in which the motor-generator is operating as a motor. FIG. 4A shows the belt 202 being driven by the crankshaft pulley 210 such that the crankshaft pulley 210, the accessory device pulley 212 and the motor-generator pulley 204 are all rotating. In addition to the torque (indicated by arrow 222) applied to the belt 202 by the crankshaft pulley 210, the motor-generator is configured to apply a secondary torque (indicated by arrow 224) to assist in driving the belt 202, for example when the torque requirements of one or more accessory devices coupled to belt 202 are large and/or when the load on the engine is high. As a result of the secondary torque 224 applied to the belt 202, the tension in the belt 202 on the first side 226 of the motor-generator pulley 204 is greater than the tension in the belt 202 on the second side 228 of the motor-generator pulley 204. As a consequence of the difference between the tensions in the belt 202 on the first and second sides 226, 228 of the motor-generator pulley 204, the first movable portion 206 rotates about the anchor point 216 and the second movable portion 208 rotates relative to the first movable portion, for example in the opposite direction to the first movable portion 206. In this manner, when the secondary torque 224 is applied to the belt 202 by the motor-generator pulley 204, the first and second movable portions 206, 208 of the belt slip monitor 200 are in second operational states.

In a similar manner to FIG. 4A, FIG. 4B shows the belt 202 being driven by the crankshaft pulley 210. However, in FIG. 4B, an increased secondary torque (indicated by arrow 224') is provided by the motor-generator. The increased secondary torque 224' is sufficient to cause the belt 202 to slip over the motor-generator pulley 204 and, as a result, torque is not transferred from the motor-generator pulley 204 to the belt 202. Consequent to the belt 202 slipping, the tension in the belt 202 on the first side 226 of the motor-generator pulley 204 is substantially equal to the tension in the belt 202 on the second side 228 of the motor-generator pulley 204 and the first and second movable portions 206, 208 are in first operational states. In this manner, the operational states of the first and second movable portions 206, 208 of the belt slip monitor 200 are dependent upon the operational torque of the motor-generator and, therefore, the tension in the belt 202 coupled to the motor-generator pulley 204.

In the example shown in FIGS. 4A and 4B, therefore, the first and second sensors are configured to determine a change between the first and second operational states of the first and second movable portions 206, 208 consequent to an increase in the driving torque 224, 224' provided by the motor-generator.

Second Example Mode of Operation for the Belt Slip Monitor

Figure 5A:
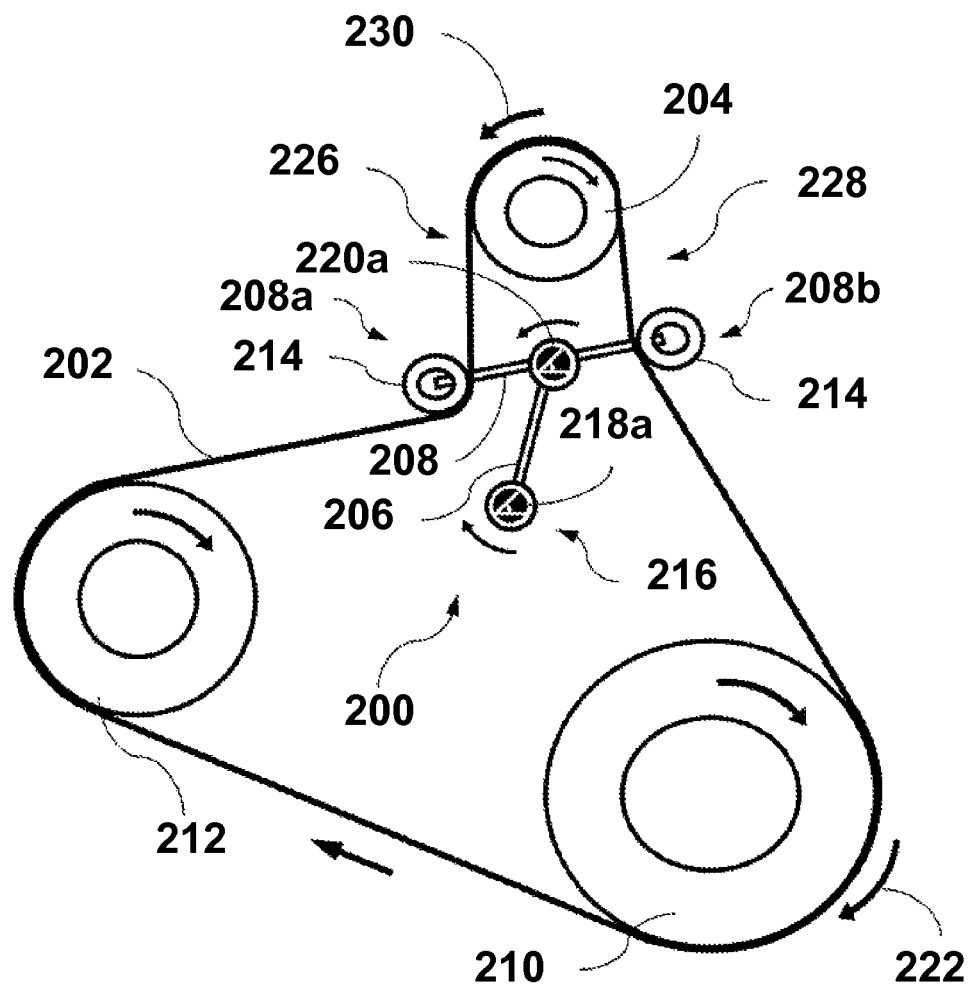
FIG. 5A shows another example mode of operation of the belt slip monitor, in which the motor-generator is operating as a generator and the belt is not slipping.
Figure 5B:
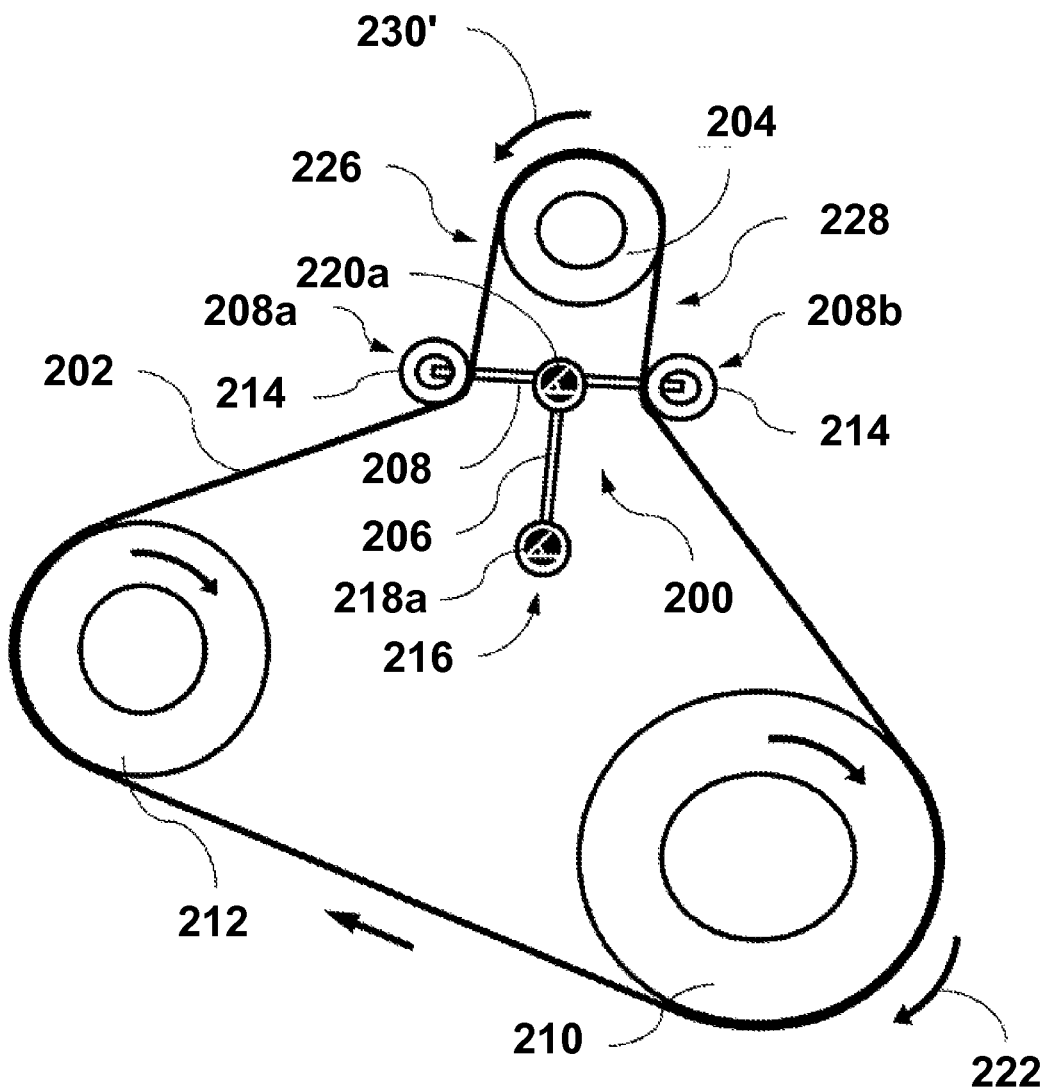
FIG. 5B shows the other example mode of operation of the belt slip monitor, in which the motor-generator is operating as a generator and the belt is slipping.

FIGS. 5A and 5B depict an example mode of operation of the belt slip monitor 200, in which the motor-generator is operating as a generator. FIG. 5A shows the belt 202 being driven by the crankshaft pulley 210 such that the crankshaft pulley 210, the accessory device pulley 212 and the motor-generator pulley 204 are all rotating. In the example shown in FIG. 5A, the motor-generator, when acting as a generator, is configured to apply a resistive torque to the belt (indicated by arrow 230). As a result of the resistive torque 230 applied to the belt 202, the tension in the belt 202 on the first side 226 of the motor-generator pulley 204 is less than the tension in the belt 202 on the second side 228 of the motor-generator pulley 204. As a consequence of the difference between the tensions in the belt 202 on the first and second sides 226, 228 of the motor-generator pulley 204, the first movable portion 206 rotates about the anchor point 216 and the second movable portion 208 rotates relative to the first movable portion, for example in the opposite direction to the first movable portion 206. In this manner, when the resistive torque is applied to the belt 202 by the motor-generator pulley 204, the first and second movable portions 206, 208 of the belt slip monitor 200 are in third operational states.

In a similar manner to FIG. 5A, FIG. 5B shows the belt 202 being driven by the crankshaft pulley 210. However, in FIG. 5B, an increased resistive torque (indicated by arrow 230') is provided by the motor-generator. The increased resistive torque 230' is sufficient to cause the motor-generator to stall and the belt 202 to slip over the motor-generator pulley 204. As a result of the belt 202 slipping, the tension in the belt 202 on the first side 226 of the motor-generator pulley 204 is substantially equal to the tension in the belt 202 on the second side 228 of the motor-generator pulley 204 and the first and second movable portions 206, 208 are in first operational states. In this manner, the operational states of the first and second movable portions 206, 208 of the belt slip monitor 200 may be dependent upon the operational torque of the motor-generator and, therefore, the tension in the belt 202 coupled to the motor-generator pulley 204.

In the example shown in FIGS. 5A and 5B, therefore, the first and second sensors may be configured to determine a change between the first and third operational states of the first and second movable portions 206, 208 consequent to an increase in the resistive torque 230, 230' provided by the motor-generator.

In the examples shown in FIGS. 4A to 5B, the change in operational states of the first and second movable portions 206, 208 is determined by the first and second angle sensors 218a, 220a (as shown in FIG. 3A). In an alternative example, however, the change in operational states of the first and second movable portions 206, 208 may be determined by the strain gauges 218b, 220b (as shown in FIG. 3B), or indeed any appropriate sensor, for example a proximity sensor, capable of determining the operational states of the first and second movable portions 206, 208. It is appreciated, therefore, that the belt slip monitor 200, as prescribed by the present application, does not require high resolution angular speed sensing of rotational components, such as pulleys or gears, in order to identify belt slip.

In the example shown in FIGS. 4A to 5B, the first and second sensors are configured to determine a change from the second and/or third operational states of the first and second movable portions 206, 208, to the first operational state of the first and second movable portions 206, 208, consequent to a sufficiently large increase in the operational torque of the motor-generator. In other words, the first and second sensors are configured to determine a change between an operational state in which the belt 202 is not slipping and another operational state in which the belt 202 is slipping. It may be appreciated, however, that the first and second sensors may be configured to determine a degree of change in the second and/or third operational states of the first and second movable portions 206, 208 owing to incremental changes in the operational torque of the motor-generator.

In one example, the tension in the belt 202, and hence the extent of the movement of the first and second movable portions 206, 208, may be dependent upon to the operational torque of the motor-generator. As such, the second and/or third operational states of the first and second movable portions 206, 208 may comprise a range of positions. In another example, the degree of strain in the first and second movable portions 206, 208 may be dependent upon the operational torque of the motor-generator. As such, the second and/or third operational states of the first and second movable portions 206, 208 may comprise a range of strain values.

Figure 6:
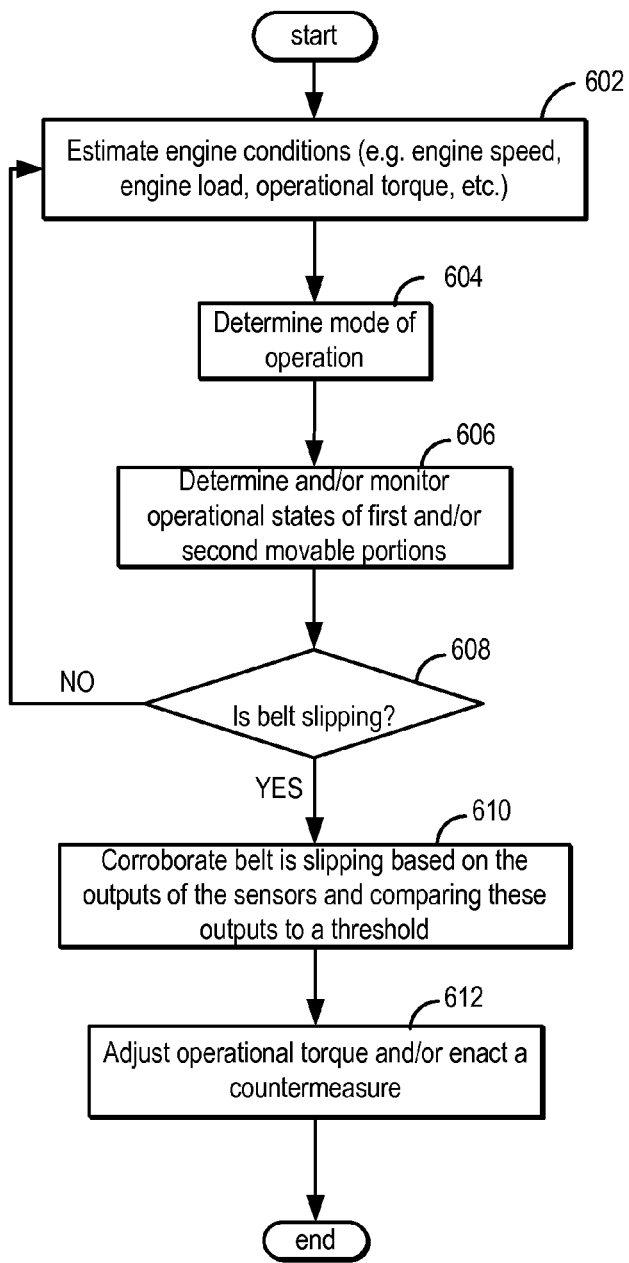
FIG. 6 shows an example method flowchart for monitoring belt slippage via a belt slip monitor.

Turning now to FIG. 6, an example operating routine 600 for a belt slip monitor system is shown. The belt slip monitor system may include a belt slip monitor as described in FIGS. 2A-3B, and a belt coupled to an ISG, such as belt 202 in FIG. 2A.

At 602, the method may estimate engine and/or operating conditions. The engine conditions may include, for example, engine speed, engine load, operational torque, etc. The engine conditions may be measured and/or estimated.

At 604, the method may determine the mode of operation. In a first mode of operation, a motor-generator, for example the one depicted in FIG. 1, is operating as a motor, wherein a secondary torque is applied in order to assist in driving the belt, which may be belt 202, for example. In a second mode of operation, the motor-generator is operating as a motor, wherein a resistive torque is applied to the belt.

At 606, the method may determine and/or monitor the operational states of the first and/or second movable portions of the belt slip monitor as depicted in FIGS. 2A-3B, for example. This may be done in part by sensors, as shown in FIGS. 3A and 3B, for example. In one example, the first and second movable portions of the belt slip monitor may comprise a first and second sensor, respectively. These sensors may be angle sensors, strain sensors, or position sensors. For example, the angle sensors may be configured to determine an angular positions of the first and second movable portions. In another example, the method may determine the operational state of a first movable portion of the belt slip monitor using a first sensor, wherein the first movable portion is movable with respect to the motor-generator and may determine the operational state of a second movable portion of the belt slip monitor using a second sensor, wherein the second movable portion is movably coupled to the first movable portion, the second movable portion being coupled to the belt such that the operational states of the first and second movable portions of the belt slip monitor are dependent upon the tension in the belt.

At 608, the method may determine whether the belt is slipping. In one example, the belt may slip if an operational or resistive torque is sufficiently large. An indication that the belt is slipping may occur if the operational state of the first movable portion and/or second movable portion of the belt slip monitor is in an equilibrium position. For example, the movable portions may be in this equilibrium position when a tension of the first side of the belt is equal to the tension of the second side of the belt, as depicted in FIG. 4B, for example. In another example, the method may determine the belt is slipping by a change in the operational states of the first and second movable portions.

At 610, the method may corroborate that the belt is slipping by, for example, comparing the outputs from the first and second sensors. In one example, the method may comprise comparing the outputs from the first and second sensors against a predetermined set of values or thresholds to corroborate that the outputs are indicative of the belt slipping.

At 612, the method may adjust an operational or resistive torque based on an indication that the belt is slipping. For example, torque demand through the belt may be reduced by adjusting the operational torque of motor-generator, engine, and/or accessory devices. Reducing the torque demand through belt may result in a reduced belt tension. In this way, the method comprises adjusting operational torque for reducing belt tension based on the operational states of the first and second movable portion of the belt slip monitor. Countermeasures may include inhibiting start-stop events, using the motor-generator and/or starter motor to assist cranking the engine, inhibiting ISG functions that transmit high-torque through the belt and/or setting a flag or a malfunction indication light. Further, a controller, such as controller 20 in FIG. 1, with non-transitory memory may have instructions to adjust operational or resistive torque or enact a countermeasure based on an indication of the belt slipping.

Although in the examples above, reference is made to the operational torque of the motor-generator affecting whether belt slip occurs, it is equally the case that the operational torque of other components associated with the belt 202, such as the engine crankshaft and/or one or more accessory devices, may affect whether belt slip occurs. The first and second movable portions 206, 208 and their respective sensors may thus also determine whether the belt 202 is slipping due to the operational torque of these other components.

It will be appreciated by those skilled in the art that although the present application has been described by way of example and with reference to the one or more examples above, it is not limited to the disclosed examples and that alternative examples could be constructed without departing from the scope of the present application as defined by the appended claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    adjusting operation of a belt-driven starter/generator and engine system of a vehicle in response to movement of a floating belt pulley determined by a first sensor attached to a first movable portion of a belt slip monitor and a second sensor attached to a second movable portion of the belt slip monitor, where the second movable portion of the belt slip monitor is coupled to a belt on either side of the floating belt pulley.

2. The method of claim 1, wherein the belt slip monitor is configured to apply a pretension to the belt by virtue of a length of the first movable portion and a length of the second movable portion, and where the second movable portion is rotatably coupled to the first movable portion.

3. The method of claim 2, wherein the adjusting includes adjusting torque of the starter/generator, and wherein the first and the second sensors are indicative of movement of the pulley relative to an engine block, the first and the second sensors further coupled to an electronic control system of the vehicle, the starter/generator adjusted via the control system, the electronic control system determining belt slipping based on the first and second sensors.

4. The method of claim 3, wherein adjusting torque of the starter/generator is based on an operational state of the first and second movable portions of the belt slip monitor, the first sensor configured to determine the operational state of the first movable portion, and the second sensor configured to determine the operational state of the second movable portion.

5. The method of claim 4, wherein the first and second movable portions are rotationally and/or slidably movable; wherein the first and second movable portions are rotationally and/or slidably coupled to each other, and wherein the second movable portion comprises one or more pulleys for engaging the belt.

6. The method of claim 4, wherein the first and second sensors comprise angle sensors configured to determine an angular position of the first and/or second movable portions.

7. The method of claim 4, wherein the first and second sensors comprise strain gauges configured to determine a strain in the first and/or second movable portions.

8. The method of claim 4, the belt slip monitor further comprising providing an indication to a driver when there is a problem with the belt.

9. The method of claim 4, wherein the belt slip monitor is configured to apply the pretension to the belt.

10. The method of claim 4, wherein the first movable portion is coupled to an anchor point that is fixed relative to movement of the starter/generator.

11. A method of monitoring slip of a belt coupled to a motor-generator using a belt slip monitor, the method comprising:
    determining an operational state of a first movable portion of the belt slip monitor using a first sensor, wherein the first movable portion is movable with respect to the motor-generator;
    determining an operational state of a second movable portion of the belt slip monitor using a second sensor, wherein the second movable portion is movably coupled to the first movable portion, the second movable portion being coupled to the belt such that the operational states of the first and second movable portions of the belt slip monitor are dependent upon tension in the belt; and
    determining whether the belt is slipping based on the operational state of the first and second movable portions,
    wherein the first and second sensors comprise angle sensors configured to determine an angular position of the first and/or second movable portions.

12. The method of claim 11, further comprising:
    adjusting an operational torque of the motor-generator in response to the operational state of the first and/or second movable portions of the belt slip monitor such that the belt does not slip.

13. The method of claim 11, further comprising comparing outputs from the first and second sensors against a predetermined set of values.

14. The method of claim 11, wherein the first and second movable portions are rotationally and/or slidably movable; wherein the first and second movable portions are rotationally and/or slidably coupled to each other, and wherein the second movable portion comprises one or more pulleys for engaging the belt.

15. The method of claim 11, the belt slip monitor further comprising one or more control devices configured to adjust an operational torque of the motor-generator in response to the operational state of the first and/or second movable portions of the belt slip monitor such that the belt does not slip.

16. The method of claim 11, wherein the tension in the belt is dependent upon an operational torque of the motor-generator, and wherein the belt slip monitor is configured to apply a pretension to the belt.

17. The method of claim 11, wherein the second movable portion is coupled to the belt at a first end of the second movable portion and is coupled to the belt at a second end of the second movable portion;
    wherein the first and second ends of the second movable portion are coupled to the belt on either side of the motor-generator.

18. The method of claim 11, further comprising:
    wherein the tension in the belt is dependent upon an operational torque of the motor-generator;
    wherein at least a portion of the first sensor is attachable to the first movable portion and at least a portion of the second sensor is attachable to the second movable portion.

19. A method of monitoring slip of a belt coupled to a motor-generator using a belt slip monitor, the method comprising:
    determining an operational state of a first movable portion of the belt slip monitor using a first sensor, wherein the first movable portion is movable with respect to the motor-generator;

determining an operational state of a second movable portion of the belt slip monitor using a second sensor, wherein the second movable portion is movably coupled to the first movable portion, the second movable portion being coupled to the belt such that the operational states of the first and second movable portions of the belt slip monitor are dependent upon tension in the belt; and determining whether the belt is slipping based on the operational state of the first and second movable portions, wherein the first and second sensors comprise strain gauges configured to determine a strain in the first and/or second movable portions, wherein the motor-generator comprises an integrated starter-generator.

20. The method of claim 19, further comprising:

adjusting an operational torque of the motor-generator in response to the operational state of the first and/or second movable portions of the belt slip monitor such that the belt does not slip.

\* \* \* \* \*